US011912069B2

(12) United States Patent
Miyoshi et al.

(10) Patent No.: US 11,912,069 B2
(45) Date of Patent: Feb. 27, 2024

(54) TIRE

(71) Applicant: Sumitomo Rubber Industries, Ltd., Hyogo (JP)

(72) Inventors: Kohei Miyoshi, Kobe (JP); Ryota Ikeda, Kobe (JP); Yuto Ohte, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/929,236

(22) Filed: Sep. 1, 2022

(65) Prior Publication Data

US 2023/0083870 A1 Mar. 16, 2023

(30) Foreign Application Priority Data

Sep. 15, 2021 (JP) ................................ 2021-150438

(51) Int. Cl.
*B60C 11/12* (2006.01)
*B60C 11/03* (2006.01)

(52) U.S. Cl.
CPC ...... *B60C 11/0306* (2013.01); *B60C 11/0304* (2013.01); *B60C 11/1204* (2013.01); *B60C 2011/0341* (2013.01)

(58) Field of Classification Search
CPC .. B60C 11/12; B60C 11/1204; B60C 11/0304
See application file for complete search history.

(56) References Cited

U.S. PATENT DOCUMENTS 4,481,327 A * 11/1984 Ogawa ..................... C08K 5/41 525/353
4,878,526 A * 11/1989 Ochiai .................... B60C 11/12 152/DIG. 3
2016/0167443 A1* 6/2016 Inoue ................. B60C 11/0306 152/209.8
2018/0009269 A1* 1/2018 Kawagoe ........... B60C 11/1236
2018/0072105 A1 3/2018 Wakasugi
2018/0086149 A1* 3/2018 Hoshino ............ B60C 11/0304
(Continued)

FOREIGN PATENT DOCUMENTS

EP 3842263 A1 6/2021
JP 2018-043637 A 3/2018
KR 10-0593004 B1 * 6/2006 ............ B60C 11/12

OTHER PUBLICATIONS

The extended European search report issued by the European Patent Office dated Jan. 31, 2023, which corresponds to European Patent Application No. 22191595.2-1012 and is related to U.S. Appl. No. 17/929,236.

*Primary Examiner* — Cedrick S Williams
(74) *Attorney, Agent, or Firm* — Studebaker & Brackett PC

(57) ABSTRACT

Provided is a 5-rib tire that can have improved steering stability and noise performance A tread portion 2 includes four circumferential grooves 3 and five land portions 4. Two tread ends are ends of a 50%-load ground-contact surface. Each of the five land portions 4 is provided with no groove having a groove width greater than 2.0 mm, and is provided with only sipes 9. The five land portions 4 include a shoulder land portion 11. The shoulder land portion 11 is provided with a plurality of shoulder sipes 20. At least one of the shoulder sipes 20 includes an inclined portion 21 and an axial portion 22. The axial portion 22 cross the tread end.

16 Claims, 13 Drawing Sheets

(56) References Cited

U.S. PATENT DOCUMENTS

| | | | | |
|---|---|---|---|---|
| 2018/0162171 | A1* | 6/2018 | Colletti | B60C 11/1392 |
| 2019/0375243 | A1 | 12/2019 | Miyazaki | |
| 2019/0389255 | A1 | 12/2019 | Kubota et al. | |
| 2021/0094357 | A1* | 4/2021 | Abarotin | B60C 11/124 |
| 2021/0107318 | A1* | 4/2021 | Speziari | B60C 11/033 |
| 2021/0197622 | A1* | 7/2021 | Okada | B60C 11/1236 |

* cited by examiner

TW
T1
T2
C
L1
L2
W1
1
2
3
4
5
6
7
8
9
11
12
13
14
15
20
25
30
35
36
37
40
46
47

7
L7
d6
32
d5
30
5

TW
C
T1
T2
a
a
a
a
a
a
a
a
a

TIRE

CROSS REFERENCE TO RELATED APPLICATION(S)

The present application claims priority to Japanese patent application JP 2021-150438, filed on Sep. 15, 2021, the entire contents of which is incorporated herein by reference in its entirety.

BACKGROUND

Technical Field

The present disclosure relates to a tire.

Background Art

Hitherto, various tires in each of which a tread portion is composed of five land portions in the tire axial direction (hereinafter, sometimes referred to as "5-rib tires") have been proposed. In addition, the pneumatic tire of Japanese Laid-Open Patent Publication No. 2018-043637 is a 5-rib tire that defines lug grooves and sipes provided on each shoulder land portion, and is expected to have improved wet performance and steering stability.

With enhancement of the performance and quieting of vehicles in recent years, tires have been required to have further improved steering stability and noise performance. In Europe, in particular, vehicle exterior noise regulations have been stricter, and tires that can meet these regulations are required.

The present disclosure has been made in view of the above circumstances, and a main object of the present disclosure is to provide a 5-rib tire that can have improved steering stability and noise performance.

SUMMARY

The present disclosure is directed to a tire including a tread portion, wherein: the tread portion includes four circumferential grooves continuously extending in a tire circumferential direction between two tread ends, and five land portions demarcated by the four circumferential grooves; the two tread ends are ends of a 50%-load ground-contact surface obtained when the tire is fitted on a normal rim with a normal internal pressure, 50% of a normal load is applied to the tire, and the tread portion is brought into contact with a flat surface at a camber angle of 0°; each of the five land portions is provided with no groove having a groove width greater than 2.0 mm, and is provided with only sipes; the five land portions include a shoulder land portion including the tread end; the four circumferential grooves include a shoulder circumferential groove adjacent to the shoulder land portion; the shoulder land portion is provided with a plurality of shoulder sipes each extending from the shoulder circumferential groove to a position beyond the tread end; at least one of the shoulder sipes includes an inclined portion extending from the shoulder circumferential groove so as to be inclined relative to a tire axial direction, and an axial portion having an angle with respect to the tire axial direction smaller than the inclined portion and not greater than 10°; and the axial portion crosses the tread end.

As a result of adopting the above configuration, the tire of the present disclosure can have improved steering stability and noise performance.

DETAILED DESCRIPTION

Figure 1:
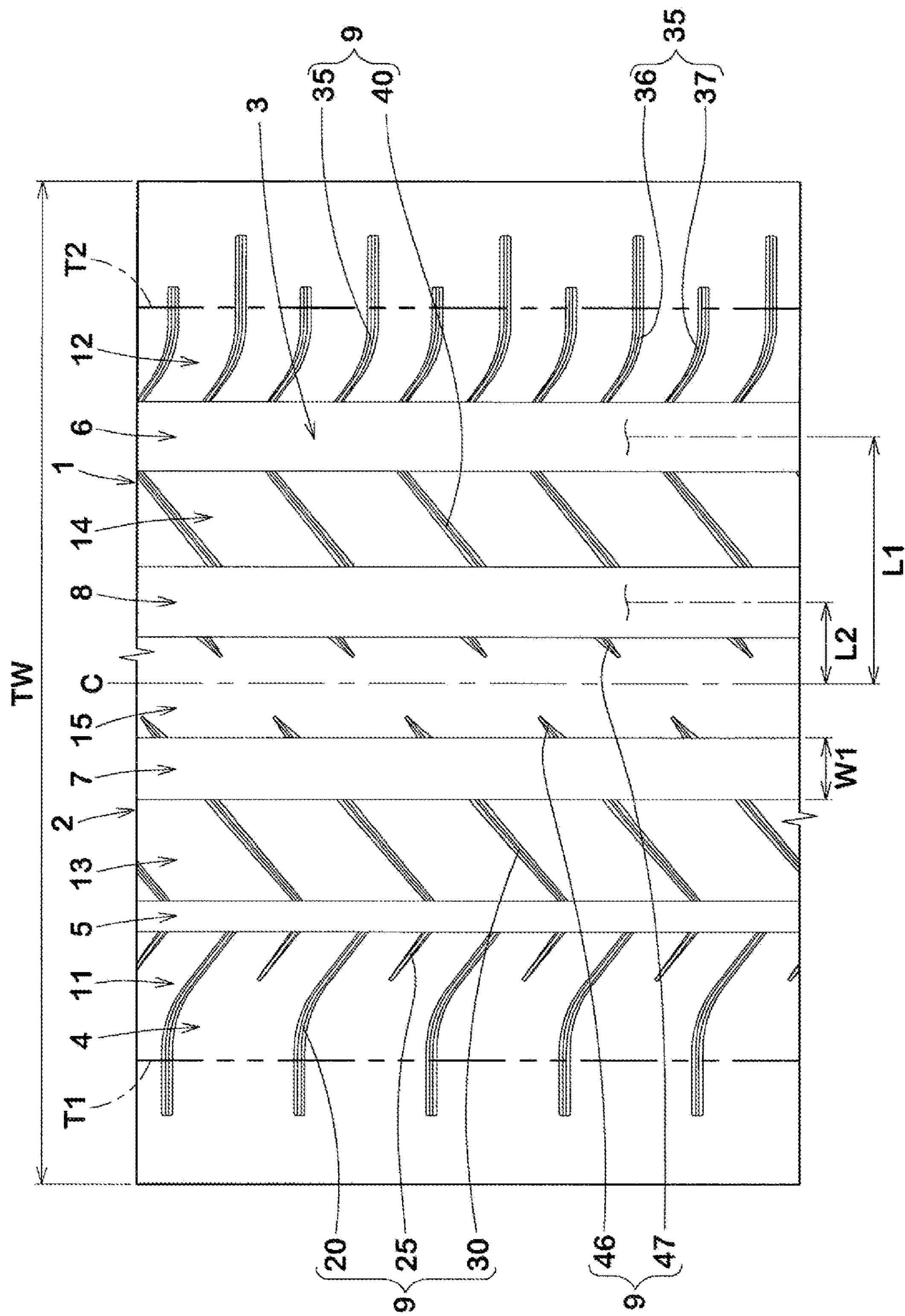
FIG. 1 is a development of a tread portion of a tire showing an embodiment of the present disclosure.

Hereinafter, an embodiment of the present disclosure will be described with reference to the drawings. FIG. 1 is a development of a tread portion 2 of a tire 1 showing the embodiment of the present disclosure. The tire 1 of the present embodiment is suitably used, for example, as a pneumatic tire for a passenger car. However, the present disclosure is not limited to such a mode, and may be applied to a heavy-duty pneumatic tire and a non-pneumatic tire the interior of which is not filled with pressurized air.

As shown in FIG. 1, the tread portion 2 of the present disclosure includes four circumferential grooves 3 continuously extending in the tire circumferential direction between two tread ends, and five land portions 4 demarcated by these circumferential grooves 3. That is, the tire 1 of the present disclosure is configured as a so-called 5-rib tire in which the tread portion 2 includes four circumferential grooves 3 and five land portions 4. Hereinafter, in the present specification, one of two tread ends is sometimes referred to as a first tread end T1, and the other of the two tread ends is sometimes referred to as a second tread end T2.

The tread portion 2 of the present embodiment has, for example, a designated mounting direction to a vehicle. Accordingly, the first tread end T1 is intended to be located on the outer side of the vehicle when the tire 1 is mounted on the vehicle. The second tread end T2 is intended to be located on the inner side of the vehicle when the tire 1 is mounted on the vehicle. The mounting direction to a vehicle is indicated, for example, by characters or marks on a sidewall portion (not shown). However, the tire 1 of the present disclosure is not limited to such a mode, and may be a tire that does not have a designated mounting direction to a vehicle.

The first tread end T1 and the second tread end T2 correspond to ends of a 50%-load ground-contact surface obtained when 50% of a normal load is applied to the tire 1 in a normal state and the tread portion 2 is brought into contact with a flat surface at a camber angle of 0°.

In the case of a pneumatic tire for which various standards are defined, the "normal state" is a state where the tire is fitted on a normal rim and inflated to a normal internal pressure and no load is applied to the tire. In the case of a non-pneumatic tire or a tire for which various standards are not defined, the normal state means a standard use state, corresponding to the purpose of use of the tire, where the tire is not mounted on a vehicle and no load is applied to the tire. In the present description, unless otherwise specified, dimensions and the like of components of the tire are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

In the case of a pneumatic tire for which various standards are defined, the "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard. In addition, in the case of a tire for which various standards are not defined, the "normal load" refers to the maximum load applicable when the tire is used, according to the above-described standards.

The circumferential grooves 3 include two shoulder circumferential grooves 5 and 6, and two crown circumferential grooves 7 and 8 provided between the shoulder circumferential grooves 5 and 6. Hereinafter, in the present specification, the shoulder circumferential groove provided on the first tread end T1 side is sometimes referred to as a first shoulder circumferential groove 5, and the shoulder circumferential groove provided on the second tread end T2 side is sometimes referred to as a second shoulder circumferential groove 6. In addition, the two crown circumferential grooves 7 and 8 are provided with a tire equator C therebetween. Hereinafter, in the present specification, the crown circumferential groove provided between the first shoulder circumferential groove 5 and the tire equator C is sometimes referred to as a first crown circumferential groove 7, and the crown circumferential groove provided between the second shoulder circumferential groove 6 and the tire equator C is sometimes referred to as a second crown circumferential groove 8.

A distance L1 in the tire axial direction from the tire equator C to a groove center line of the first shoulder circumferential groove 5 or the second shoulder circumferential groove 6 is preferably, for example, 20% to 30% of a tread width TW. A distance L2 in the tire axial direction from the tire equator C to a groove center line of the first crown circumferential groove 7 or the second crown circumferential groove 8 is preferably, for example, 5% to 15% of the tread width TW. The tread width TW is the distance in the tire axial direction from the first tread end T1 to the second tread end T2 in the normal state.

Each circumferential groove 3 of the present embodiment extends, for example, in a straight manner so as to be parallel to the tire circumferential direction. Each circumferential groove 3 may extend, for example, in a wavy manner.

A groove width W1 of each circumferential groove 3 is preferably at least not less than 3 mm. In addition, the groove width W1 of each circumferential groove 3 is preferably, for example, 3.0% to 8.5% of the tread width TW. In the present embodiment, the first shoulder circumferential groove 5 has the smallest groove width among a plurality of the circumferential grooves 3.

Figure 2:
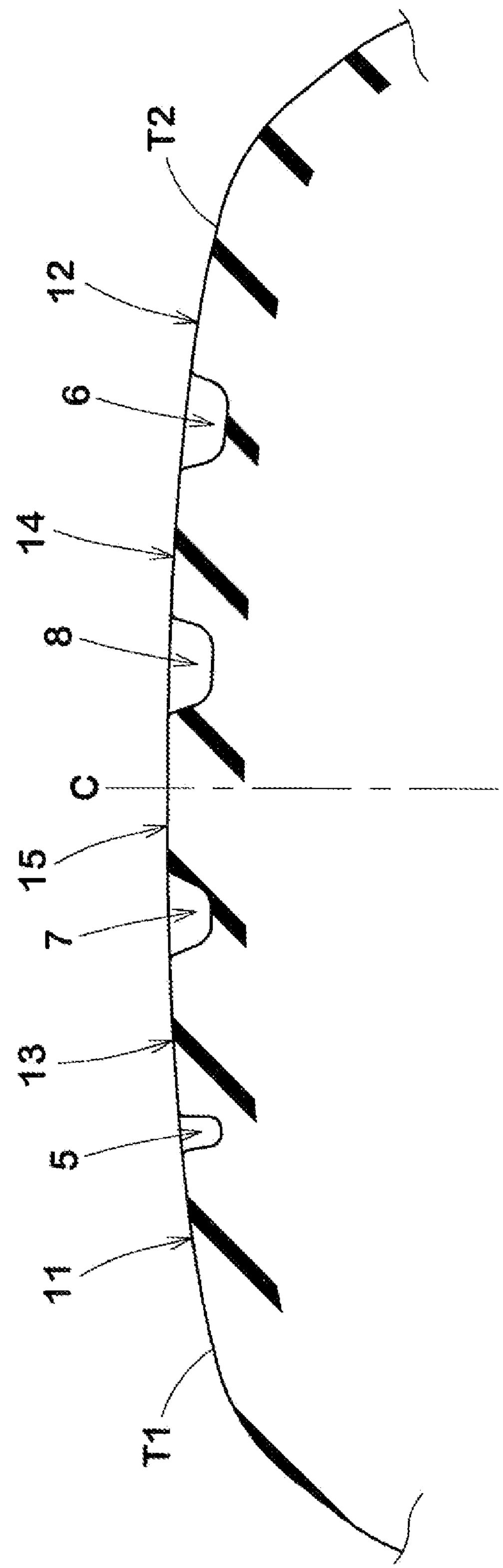
FIG. 2 is a cross-sectional view, of the tire in FIG. 1, including the rotation axis of the tire.

FIG. 2 is a cross-sectional view, of the tire 1 of the present embodiment, including the rotation axis of the tire 1. As shown in FIG. 2, the depth of each circumferential groove 3 is, for example, 5 to 10 mm in the case of a pneumatic tire for a passenger car. In a preferable mode, the first shoulder circumferential groove 5 has the smallest depth among the four circumferential grooves 3. In a more preferable mode, the first crown circumferential groove 7, the second crown circumferential groove 8, and the second shoulder circumferential groove 6 are each formed as a flat groove having a smaller depth than the groove width thereof. However, the present disclosure is not limited to such a mode.

As shown in FIG. 1, each land portion 4 demarcated in the tread portion 2 is provided with no groove having a groove width greater than 2.0 mm, and is provided with only sipes 9, in a ground-contact surface thereof. The groove means a groove in which, in a transverse cross-section thereof, a region where the distance between two groove walls is greater than 2.0 mm exceeds 50% of the total depth of the groove. Meanwhile, in the present specification, the "sipe" means a small-width slit which has two inner walls extending in the tire radial direction and in which, in a transverse cross-section thereof, a region where the distance between the two inner walls is not greater than 2.0 mm is not less than 50% of the total depth of the slit.

Figure 3:
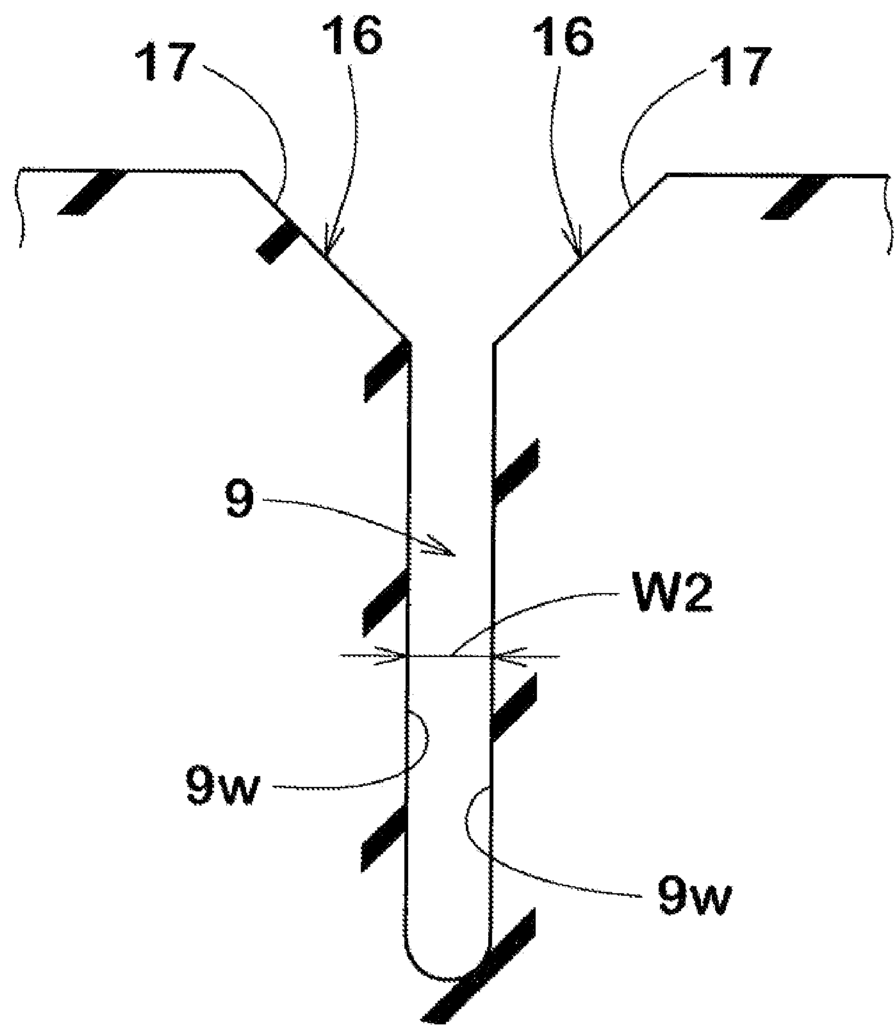
FIG. 3 is a transverse cross-sectional view of a sipe.

FIG. 3 shows a transverse cross-sectional view of a typical sipe 9 in the present embodiment. As shown in FIG. 3, in the sipe 9, a width W2 between two sipe walls 9*w* extending so as to face and be substantially parallel to each other is preferably not greater than 1.5 mm, and is 0.4 to 1.0 mm in a more preferable mode. In addition, the total depth of the sipe 9 is, for example, 3.0 to 5.5 mm.

At least one of sipe edges on both sides of the sipe 9 is formed, for example, as a chamfered portion 16. Each of the sipe edges on both sides of the sipe 9 of the present embodiment is formed as a chamfered portion 16. Hereinafter, such a sipe 9 is sometimes referred to as a chamfered sipe. The chamfered portion 16 is formed so as to include an inclined surface 17 connected to the ground-contact surface and the sipe wall 9*w*. An angle of the inclined surface 17 with respect to the depth direction of the sipe 9 is, for example, 30 to 60°.

The depth of the chamfered portion 16 is, for example, less than 30% of the total depth of the sipe 9, specifically not greater than 2.0 mm, and more preferably not greater than 1.0 mm. If the chamfered portion 16 having such a depth is included, the opening width of the chamfered sipe may exceed 2.0 mm. In addition, in the present disclosure, each sipe 9 is not limited to the above-described mode. Therefore, the sipe 9 may extend with a uniform width from an opening in the ground-contact surface to a bottom portion thereof. In addition, a flask bottom having a width greater than 2.0 mm may be connected to the bottom portion of the sipe 9.

As shown in FIG. 1, the five land portions 4 of the present disclosure include at least one shoulder land portion including a tread end. The five land portions 4 of the present embodiment include two shoulder land portions (a first shoulder land portion 11 and a second shoulder land portion 12). The first shoulder land portion 11 includes the first tread end T1 and is demarcated outward of the first shoulder circumferential groove 5 in the tire axial direction. In addition, the second shoulder land portion 12 includes the second tread end T2 and is demarcated outward of the second shoulder circumferential groove 6 in the tire axial direction. In the present embodiment, the five land portions 4 also include two middle land portions (a first middle land portion 13 and a second middle land portion 14) and a crown land portion 15. The first middle land portion 13 is demarcated between the first shoulder circumferential groove 5 and the first crown circumferential groove 7. The second middle land portion 14 is demarcated between the second shoulder circumferential groove 6 and the second crown circumferential groove 8. The crown land portion 15 is demarcated between the first crown circumferential groove 7 and the second crown circumferential groove 8.

Figure 4:
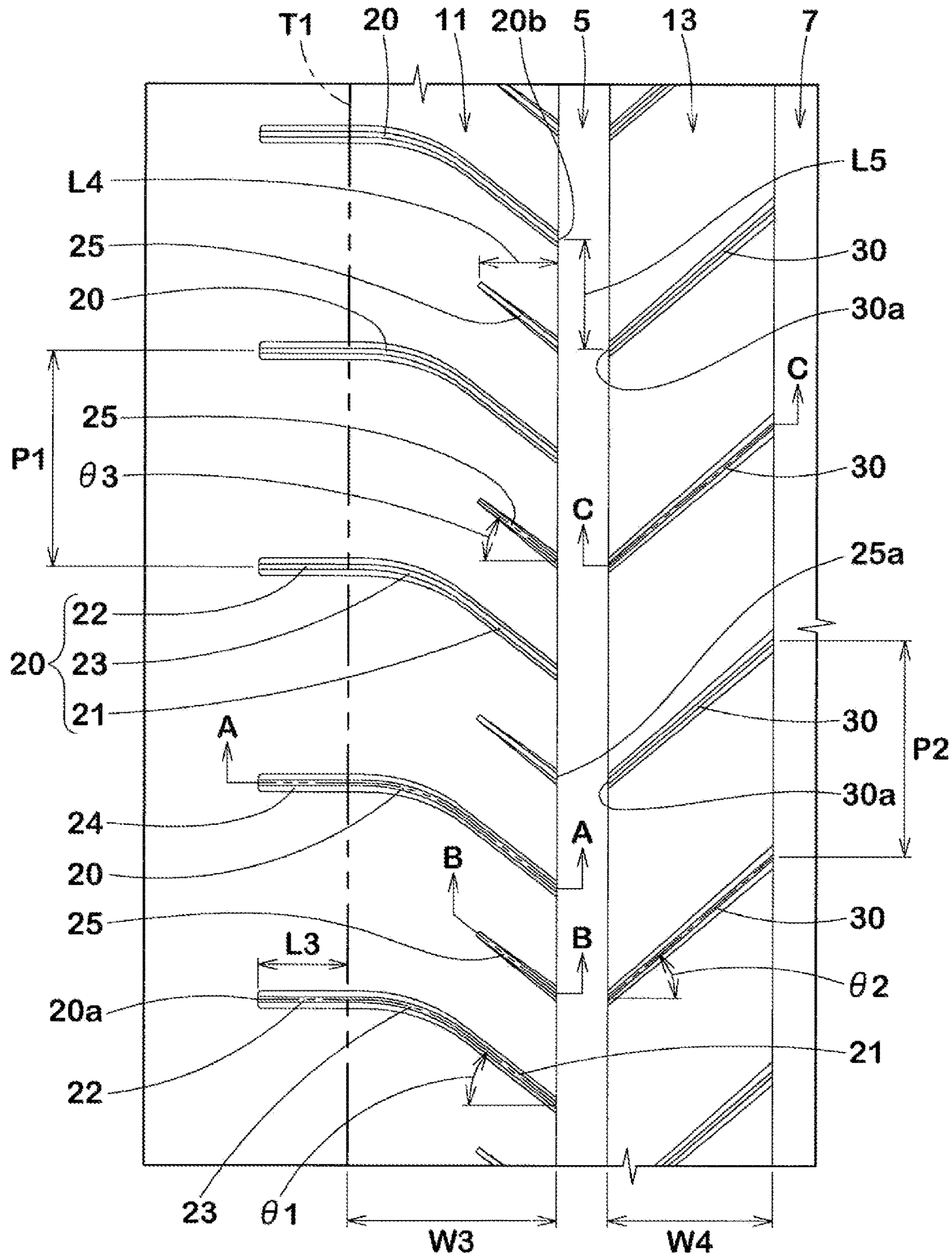
FIG. 4 is an enlarged view of a first shoulder land portion and a first middle land portion in FIG. 1.

FIG. 4 shows an enlarged view of the first shoulder land portion 11 and the first middle land portion 13. As shown in FIG. 4, at least one of the shoulder land portions of the present disclosure is provided with a plurality of shoulder sipes each extending from the shoulder circumferential groove to a position beyond the tread end. As a more specific mode, the first shoulder land portion 11 of the present embodiment is provided with a plurality of first shoulder sipes 20 each extending from the first shoulder circumferential groove 5 to a position beyond the first tread end T1.

At least one of the shoulder sipes (first shoulder sipes 20) includes an inclined portion 21 and an axial portion 22. The inclined portion 21 extends from the first shoulder circumferential groove 5 so as to be inclined relative to the tire axial direction. The axial portion 22 has an angle with respect to the tire axial direction smaller than that of the inclined portion 21 and not greater than 10°. In addition, in the present disclosure, the axial portion 22 crosses the first tread end T1 which is an end of the 50%-load ground-contact surface. In the present disclosure, as a result of adopting the above configuration, steering stability and noise performance can be improved. As for the reason for this, the following mechanism is inferred.

In the present disclosure, since each land portion 4 is provided with no groove having a groove width greater than 2.0 mm, and is provided with only sipes 9, pattern noise is low and excellent noise performance is exhibited. In addition, such a land portion 4 has high pattern stiffness and serves to improve steering stability.

Moreover, since the first shoulder sipes 20 include the inclined portions 21, the entire edges of the first shoulder sipes 20 can each come into contact with the ground with a time difference, so that sounds can be reduced when these edges come into contact with the ground.

In the present disclosure, since the axial portion 22 crosses the first tread end T1, the stiffness in the tire axial direction of the land portion near the first tread end T1 is not decreased by the first shoulder sipe 20, and excellent steering stability can be expected. In addition, such an axial portion 22 can provide a frictional force in the tire circumferential direction during braking by the edges thereof. In the present disclosure, noise performance and steering stability can be inferred to be improved by the above mechanism.

Hereinafter, more detailed configurations of the present embodiment will be described. The configurations described below show a specific mode of the present embodiment. Therefore, it is needless to say that the present disclosure can achieve the above-described effect even when the configurations described below are not provided. In addition, even when any one of the configurations described below is independently applied to the tire according to the present disclosure having the above-described characteristics, performance improvement corresponding to each configuration can be expected. Furthermore, when some of the configurations described below are applied in combination, complex performance improvement corresponding to each configuration can be expected.

A one-pitch length P1 in the tire circumferential direction of the plurality of first shoulder sipes 20 is, for example, 80% to 120% of a width W3 of the ground-contact surface of the first shoulder land portion 11. Such arrangement of the first shoulder sipes 20 serves to improve steering stability and noise performance in a well-balanced manner.

In the present embodiment, the inclined portion 21 is inclined downward toward the right side relative to the tire axial direction. Hereinafter, the direction of such inclination is sometimes referred to as "inclined in a first direction relative to the tire axial direction". A maximum angle θ1 of the inclined portion 21 with respect to the tire axial direction is, for example, 16.5 to 57.9°, and preferably 27.2 to 47.2°. Such an inclined portion 21 can increase responsiveness during steering while maintaining noise performance.

The axial portion 22 extends, for example, in a straight manner. The axial portion 22 is preferably provided at an angle of 5° or less with respect to the tire axial direction, and is provided parallel to the tire axial direction in a more preferable mode. Such an axial portion 22 can provide a large frictional force during braking by the edges thereof.

A distance L3 in the tire axial direction from an outer end **20*a* of the first shoulder sipe 20 to the first tread end T1 is, for example, 25% to 55%, and preferably 30% to 50%, of the width W3 in the tire axial direction of the ground-contact surface of the first shoulder land portion 11. Such an axial portion 22** can also improve anti-wandering performance in addition to improving steering stability and noise performance.

Each first shoulder sipe 20 preferably includes a curved portion 23 extending so as to be curved between the inclined portion 21 and the axial portion 22. The curved portion 23 has, for example, an arc shape having a radius of curvature of 10 to 40 mm. Such a curved portion 23 can suppress uneven wear of the first shoulder land portion 11.

Each first shoulder sipe 20 is formed as the above-described chamfered sipe, and each of the entire sipe edges on both sides thereof is formed as a chamfered portion. In addition, in a tread plan view, the width of each chamfered portion 24 of the first shoulder sipe 20 increases toward the outer side in the tire axial direction. Specifically, each of the chamfered portions of the inclined portion 21 and the axial portion 22 extends with a uniform width, and the width of each chamfered portion of the curved portion 23 increases toward the outer side in the tire axial direction. Accordingly, in a tread plan view, the width of each chamfered portion of the axial portion 22 is larger than the width of each chamfered portion of the inclined portion 21. Specifically, the width of each chamfered portion of the axial portion 22 is 1.5 to 2.5 times the width of each chamfered portion of the inclined portion 21. The first shoulder sipe 20 having such chamfered portions can effectively suppress uneven wear around the first tread end T1. It is needless to say that the width of the chamfered portion described above means a width in a direction orthogonal to the longitudinal direction of the sipe in a tread plan view.

Figure 5:
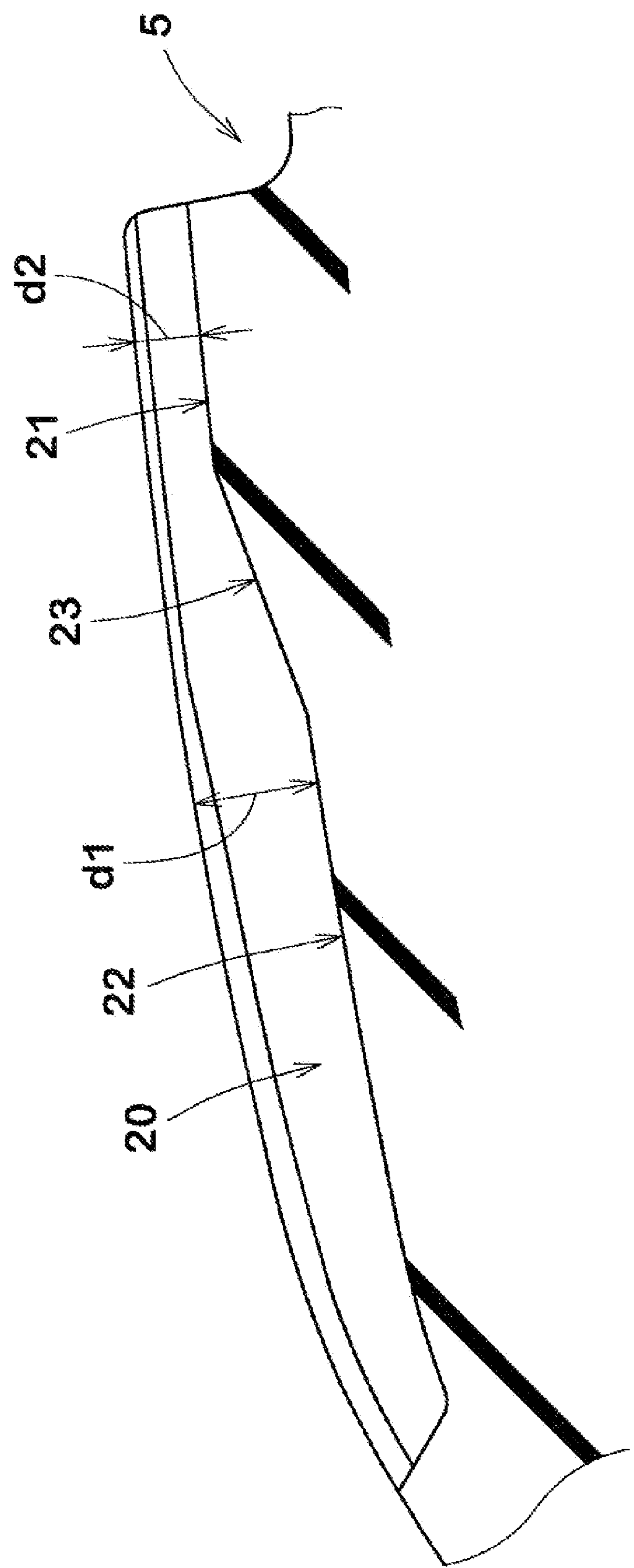
FIG. 5 is a cross-sectional view taken along a line A-A in FIG. 4.

FIG. 5 shows a cross-sectional view taken along a line A-A in FIG. 4. As shown in FIG. 5, the depth of the first shoulder sipe 20 increases from the inclined portion 21 toward the axial portion 22. In addition, a depth d2 of the inclined portion 21 is 40% to 60% of a maximum depth d1 of the axial portion 22. Accordingly, the stiffness on the inner side in the tire axial direction of the first shoulder land portion 11 is improved, and excellent steering stability is exhibited.

As shown in FIG. 4, the first shoulder land portion 11 of the present embodiment is provided with a plurality of shoulder termination sipes 25. In the present embodiment, the first shoulder sipes 20 and the shoulder termination sipes 25 are alternately provided in the tire circumferential direction.

Each shoulder termination sipe 25 extends from the first shoulder circumferential groove 5 and terminates without reaching the first tread end T1. The shoulder termination sipe 25 terminates, for example, on the inner side in the tire axial direction with respect to the axial portion 22 of the first shoulder sipe 20, and terminates on the inner side in the tire axial direction with respect to the curved portion 23 of the first shoulder sipe 20 in a preferable mode. In a further preferable mode, the shoulder termination sipe 25 terminates without crossing the center position in the tire axial direction of the ground-contact surface of the first shoulder land portion 11. A length L4 in the tire axial direction of the shoulder termination sipe 25 is, for example, 25% to 45%, and preferably 30% to 40%, of the width W3 of the ground-contact surface of the first shoulder land portion 11. Such a shoulder termination sipe 25 can further improve steering stability and noise performance.

The shoulder termination sipe 25 is inclined in the first direction relative to the tire axial direction. That is, the shoulder termination sipe 25 is inclined in the same direction as the inclined portion 21 of the first shoulder sipe 20. An angle θ3 of the shoulder termination sipe 25 with respect to the tire axial direction is, for example, 16.5 to 57.9°, and preferably 27.2 to 47.2°. In addition, the angle difference between the shoulder termination sipe 25 and the inclined portion 21 is, for example, not greater than 10°, and preferably not greater than 5°. As a more preferable mode, in the present embodiment, the shoulder termination sipes 25 and the inclined portions 21 extend parallel to each other. Accordingly, uneven wear of the first shoulder land portion 11 is suppressed.

The shoulder termination sipe 25 is preferably formed as a chamfered sipe. The width of each chamfered portion of the shoulder termination sipe 25 decreases from the first shoulder circumferential groove 5 side toward the outer side in the tire axial direction. Accordingly, the width of the chamfered portion at an inner end portion in the tire axial direction of each chamfered portion of the shoulder termination sipe 25 is larger than the width of the chamfered portion at an outer end portion in the tire axial direction of each chamfered portion of the shoulder termination sipe 25. In a more preferable mode, the maximum width of each chamfered portion of the shoulder termination sipe 25 is set at an end portion on the first shoulder circumferential groove 5 side of the shoulder termination sipe 25, and is made equal to the width of each chamfered portion of the inclined portion 21. In addition, the width of each chamfered portion of the shoulder termination sipe 25 continuously decreases from the position at which the maximum width is set, toward the outer side in the tire axial direction.

Figure 6:
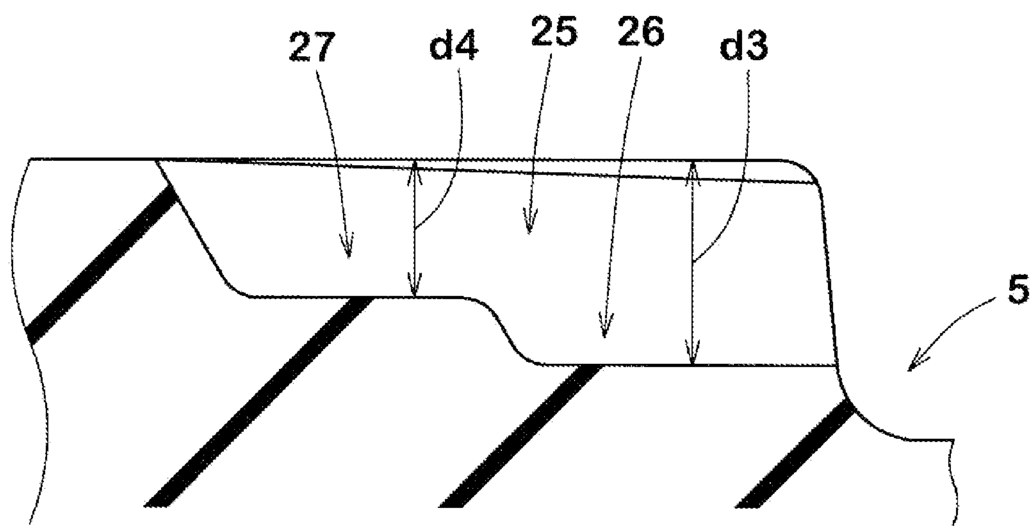
FIG. 6 is a cross-sectional view taken along a line B-B in FIG. 4.

FIG. 6 shows a cross-sectional view taken along a line B-B in FIG. 4. As shown in FIG. 6, the shoulder termination sipe 25 includes a first portion 26 communicating with the first shoulder circumferential groove 5, and a second portion 27 connected to the outer side in the tire axial direction of the first portion 26 and having a smaller depth than the first portion 26. A depth d4 of the second portion 27 is, for example, 60% to 75% of a depth d3 of the first portion 26. Such a shoulder termination sipe 25 can maintain the stiffness of the first shoulder land portion 11 and can improve steering stability.

As shown in FIG. 4, the first middle land portion 13 is provided with a plurality of first middle sipes 30. A one-pitch length P2 in the tire circumferential direction of the plurality of first middle sipes 30 is, for example, 100% to 150% of a width W4 in the tire axial direction of the ground-contact surface of the first middle land portion 13, and is equal to the one-pitch length P1 of the first shoulder sipes 20 in the present embodiment.

Each first middle sipe 30 fully traverses the first middle land portion 13 in the tire axial direction so as to be inclined relative to the tire axial direction. The first middle sipe 30 is inclined, for example, upward toward the right side relative to the tire axial direction. Hereinafter, the direction of such inclination is sometimes referred to as “inclined in a second direction relative to the tire axial direction”. In other words, the first middle sipe 30 is inclined relative to the tire axial direction in a direction opposite to that of the inclined portion 21 of the first shoulder sipe 20.

A maximum angle θ2 of the first middle sipe 30 with respect to the tire axial direction is, for example, 15.9 to 65.3°, and preferably 28.6 to 52.6°. Such a first middle sipe 30 can provide a frictional force in the tire circumferential direction and the tire axial direction in a well-balanced manner.

In the present embodiment, the maximum angle θ1 of the inclined portion 21 of each first shoulder sipe 20 with respect to the tire axial direction is not greater than the maximum angle θ2 of each first middle sipe 30 with respect to the tire axial direction. Moreover, the difference between the angle θ1 and the angle θ2 is not greater than 5°. The angle θ1 and the angle θ2 are each the absolute value of the acute angle formed between the sipe and a virtual line extending parallel to the tire axial direction, and the difference therebetween means the value obtained by subtracting the absolute value of the angle θ1 from the absolute value of the angle θ2.

In the case where the angle between the inclined portion 21 of the first shoulder sipe 20 and the first middle sipe 30 has the above-described relationship, the stiffness in the tire axial direction of the first shoulder land portion 11 is equal to or slightly higher than that of the first middle land portion 13. Such a stiffness distribution can improve linearity and responsiveness during steering, and can further improve steering stability.

A distance L5 in the tire circumferential direction from an end 30*a* on the first shoulder circumferential groove 5 side of the first middle sipe 30 to an end 20*b* on the first shoulder circumferential groove 5 side of the first shoulder sipe 20 is, for example, 10% to 50%, and preferably 30% to 50%, of the one-pitch length P2 in the tire circumferential direction of the plurality of first middle sipes 30. Accordingly, steering stability and noise performance are improved in a well-balanced manner.

Moreover, a distance in the tire circumferential direction from the end 30*a* of the first middle sipe 30 to an end 25*a* on the first shoulder circumferential groove 5 side of the shoulder termination sipe 25 is, for example, not greater than 20%, and preferably not greater than 10%, of the one-pitch length P2. In the present embodiment, the above distance is substantially 0. In other words, the end 30*a* faces the end 25*a*.

Each first middle sipe 30 is formed, for example, as a chamfered sipe. Specifically, the entire sipe edges on both sides of the first middle sipe 30 are formed as chamfered portions. In addition, in a tread plan view, the width of each chamfered portion of the first middle sipe 30 continuously increases toward the tire equator C side. Accordingly, the width of each chamfered portion is the maximum at an end portion on the tire equator C side of the first middle sipe 30. Moreover, in a further preferable mode, the maximum width of each chamfered portion of the first middle sipe 30 is larger than the maximum width of each chamfered portion of the inclined portion 21 of the first shoulder sipe 20. Accordingly, steering stability and noise performance can be improved while uneven wear of the first middle land portion 13 is suppressed.

Figure 7:
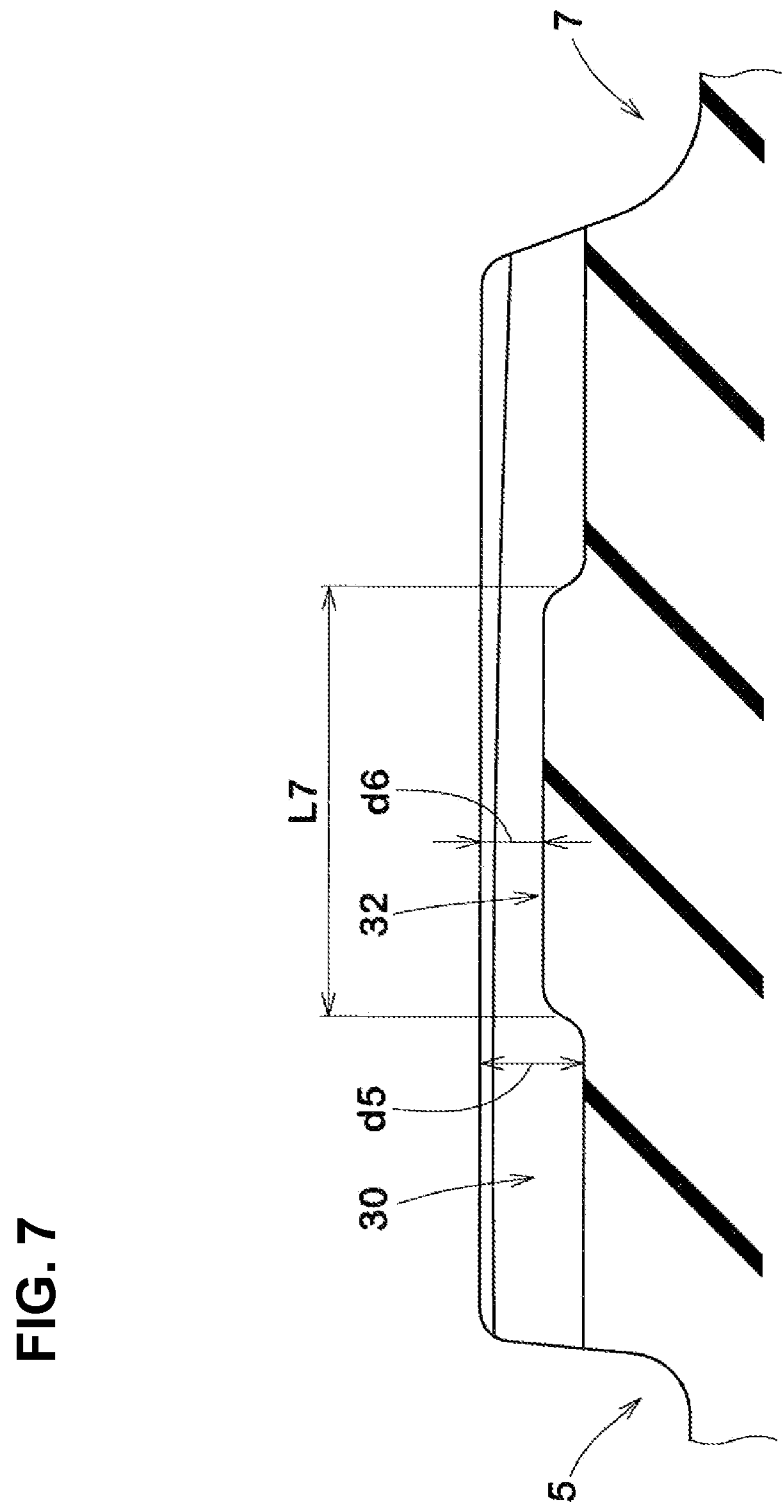
FIG. 7 is a cross-sectional view taken along a line C-C in FIG. 4.

FIG. 7 shows a cross-sectional view taken along a line C-C in FIG. 4. As shown in FIG. 7, the first middle sipe 30 includes, for example, a first middle tie bar 32 raised locally at a bottom portion thereof. The first middle tie bar 32 is provided, for example, in a center region out of three equal regions into which the first middle sipe 30 is divided in the tire axial direction. A length L7 in the tire axial direction of the first middle tie bar 32 is 30% to 50% of the width W4 in the tire axial direction (shown in FIG. 4) of the ground-contact surface of the first middle land portion 13. In the case where the length in the tire axial direction of the first middle tie bar 32 varies in the tire radial direction, the length is measured at the center position in the tire radial direction. A depth d6 from the ground-contact surface of the first middle land portion 13 to the outer surface of the first middle tie bar 32 is 50% to 70% of a maximum depth d5 of the first middle sipe 30. Such a first middle tie bar 32 can maintain the stiffness of the first middle land portion 13, and can further improve steering stability.

Figure 8:
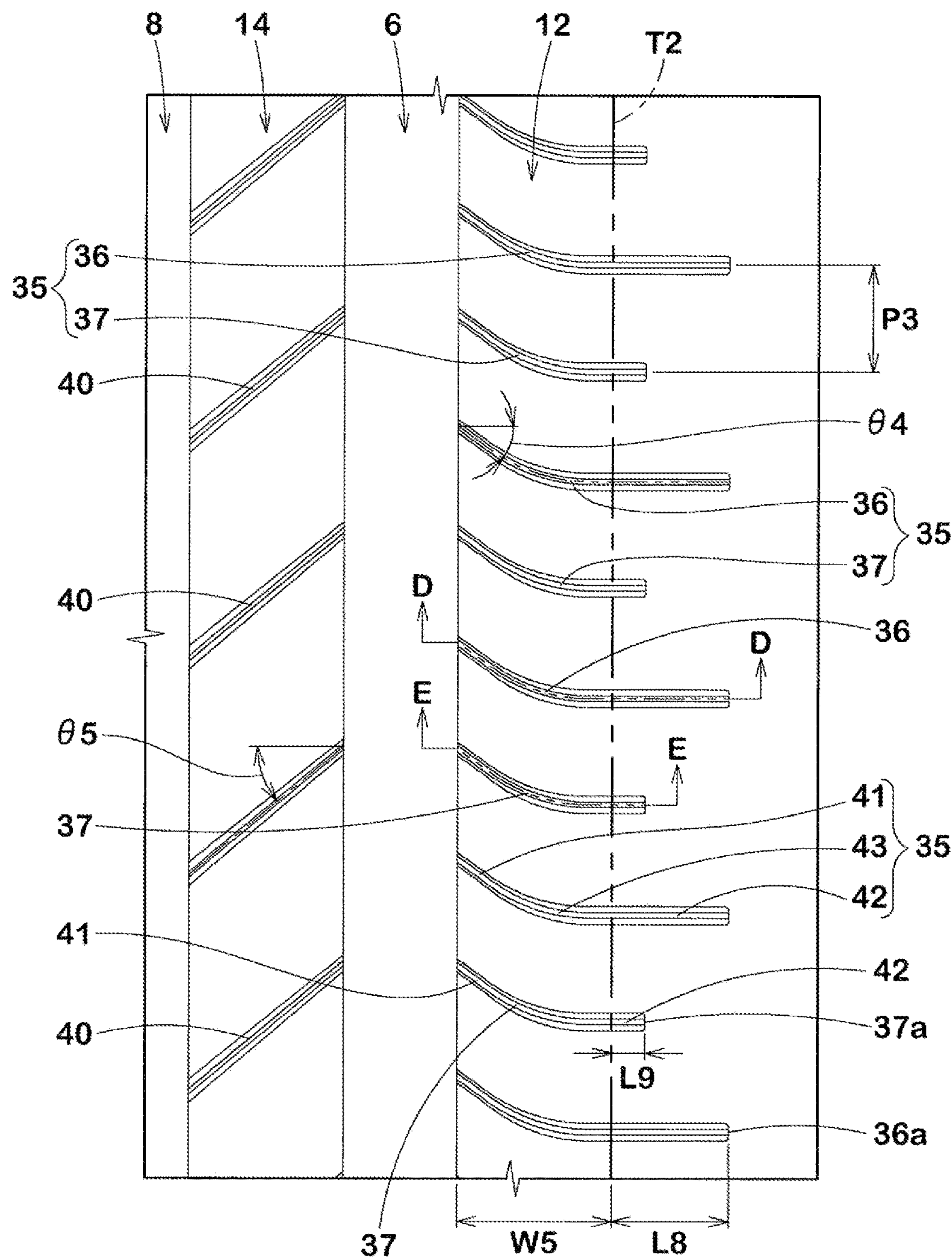
FIG. 8 is an enlarged view of a second shoulder land portion and a second middle land portion in FIG. 1.

FIG. 8 shows an enlarged view of the second shoulder land portion 12 and the second middle land portion 14. As shown in FIG. 8, the second shoulder land portion 12 of the present embodiment is provided with a plurality of shoulder sipes (second shoulder sipes 35) which are the same as the above-described first shoulder sipes 20.

A one-pitch length P3 in the tire circumferential direction of the plurality of second shoulder sipes 35 is preferably, for example, smaller than a width W5 in the tire axial direction of the ground-contact surface of the second shoulder land portion 12, and specifically 60% to 80% of the width W5. In addition, the one-pitch length P3 is 40% to 60% of the one-pitch length P1 (shown in FIG. 4) of the first shoulder sipes 20. Accordingly, the number of shoulder sipes (second shoulder sipes 35) provided on the second shoulder land portion 12 is larger than the number of shoulder sipes (first shoulder sipes 20) provided on the first shoulder land portion 11. Owing to such arrangement of the sipes, striking sounds generated when the first shoulder land portion 11 and the second shoulder land portion 12 come into contact with the ground are made to become white noise, so that noise performance is improved.

Each second shoulder sipe 35 extends from the second shoulder circumferential groove 6 to a position beyond the second tread end T2. The second shoulder sipe 35 includes, for example, an inclined portion 41, an axial portion 42, and a curved portion 43. The inclined portion 41 extends from the second shoulder circumferential groove 6 so as to be inclined. The axial portion 42 has an angle with respect to the tire axial direction smaller than that of the inclined portion 41 and not greater than 10°. In addition, the axial portion 42 crosses the second tread end T2. The curved portion 43 extends so as to be curved between the inclined portion 41 and the axial portion 42. Such a second shoulder sipe 35 can improve steering stability and noise performance by the same mechanism as the first shoulder sipe 20.

The configurations of the inclined portion 21, the axial portion 22, and the curved portion 23 of the first shoulder sipe 20 described above can be applied to the inclined portion 41, the axial portion 42, and the curved portion 43 of the second shoulder sipe 35, except for the matters described below.

The inclined portion 41 of the second shoulder sipe 35 is inclined in the first direction relative to the tire axial direction. A maximum angle θ4 of the inclined portion 41 of the second shoulder sipe 35 with respect to the tire axial direction is, for example, 16.5 to 53.7°, and preferably 26.1 to 44.1°. In addition, the angle θ4 is preferably smaller than the angle θ1 of the inclined portion 21 of the first shoulder sipe 20. In addition, the difference between the angle θ1 and the angle θ4 is preferably not greater than 5°. Accordingly, striking sounds generated when the first shoulder sipe 20 and the second shoulder sipe 35 come into contact with the ground are easily made to become white noise, so that noise performance can be improved.

The second shoulder sipes 35 include, for example, standard second shoulder sipes 36 and small second shoulder sipes 37. A distance L8 in the tire axial direction from an outer end 36*a* in the tire axial direction of each standard second shoulder sipe 36 to the second tread end T2 is preferably larger than the distance L3 in the tire axial direction (shown in FIG. 4) from the outer end 20*a* of the first shoulder sipe 20 to the first tread end T1, and specifically 125% to 140% of the distance L3.

Each small second shoulder sipe 37 has a smaller length in the tire axial direction than each standard second shoulder sipe 36. A distance L9 in the tire axial direction from an outer end 37*a* of the small second shoulder sipe 37 to the second tread end T2 is 15% to 25% of the distance L8 from the outer end 36*a* of the standard second shoulder sipe 36 to the second tread end T2. In addition, on the second shoulder land portion 12 of the present embodiment, the standard second shoulder sipes 36 and the small second shoulder sipes 37 are alternately provided in the tire circumferential direction. Such arrangement of the sipes serves to improve noise performance and anti-wandering performance.

Figure 9:
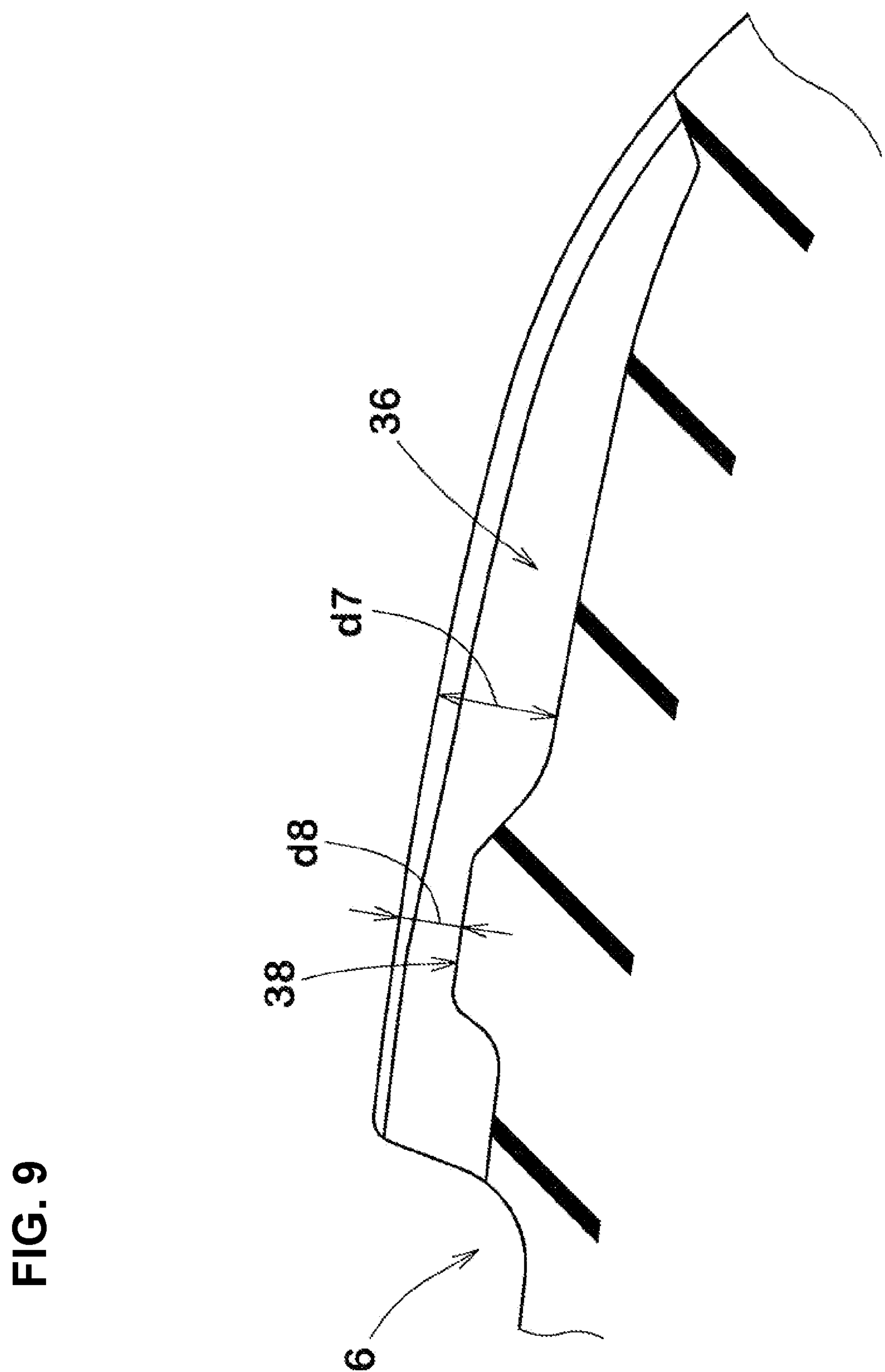
FIG. 9 is a cross-sectional view taken along a line D-D in FIG. 8.

FIG. 9 shows a cross-sectional view taken along a line D-D in FIG. 8. As shown in FIG. 9, the standard second shoulder sipe 36 includes, for example, a second shoulder tie bar 38 raised at a bottom portion thereof at a position away from an end portion on the second shoulder circumferential groove 6 side thereof. The second shoulder tie bar 38 of the present embodiment is provided, for example, at a position including at least a part of the curved portion 43. A depth d8 from the ground-contact surface to the outer surface of the second shoulder tie bar 38 is 40% to 60% of a maximum depth d7 of the standard second shoulder sipe 36. Such a second shoulder tie bar 38 maintains the stiffness of the second shoulder land portion 12, and serves to improve steering stability.

Figure 10:
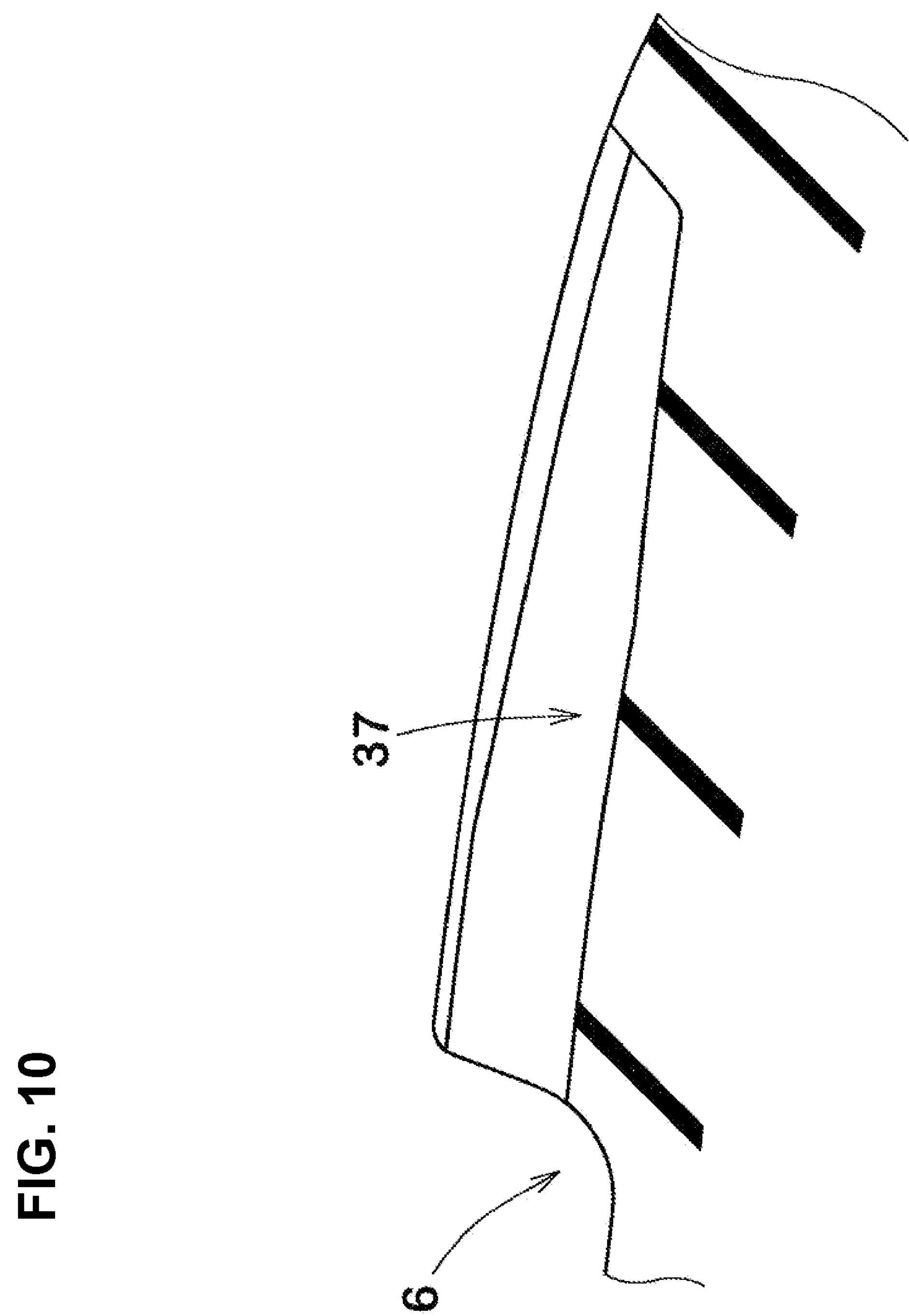
FIG. 10 is a cross-sectional view taken along a line E-E in FIG. 8.

FIG. 10 shows a cross-sectional view taken along a line E-E in FIG. 8. As shown in FIG. 10, the small second shoulder sipe 37 has a bottom portion extending flat in the longitudinal direction thereof. That is, the small second shoulder sipe 37 includes no tie bar raised at the bottom portion thereof. In the present embodiment, since such small second shoulder sipes 37 and the above-described standard second shoulder sipes 36 are provided, striking sounds generated when these sipes come into contact with the ground are made to become white noise, so that noise performance is improved.

As shown in FIG. 8, the second middle land portion 14 is provided with a plurality of second middle sipes 40. The configuration of the above-described first middle sipe 30 can be applied to each second middle sipe 40 except for the matters described below, and the description thereof is omitted here.

A maximum angle θ5 of the second middle sipe 40 with respect to the tire axial direction is preferably smaller than the maximum angle θ2 (shown in FIG. 4) of the first middle sipe 30 with respect to the tire axial direction. In a further preferable mode, the absolute value |θ5−θ4| of the difference between the maximum angle θ5 of the second middle sipe 40 with respect to the tire axial direction and the maximum angle θ4 of the inclined portion 41 of the second shoulder sipe 35 with respect to the tire axial direction is preferably larger than the absolute value |θ2−θ1| of the difference between the maximum angle θ2 of the first middle sipe 30 with respect to the tire axial direction and the maximum angle θ1 of the inclined portion 21 of the first shoulder sipe 20 with respect to the tire axial direction. Accordingly, while uneven wear of each land portion is suppressed, striking sounds generated when each sipe comes into contact with the ground are easily made to become white noise, so that wear resistance and noise performance are improved.

Figure 11:
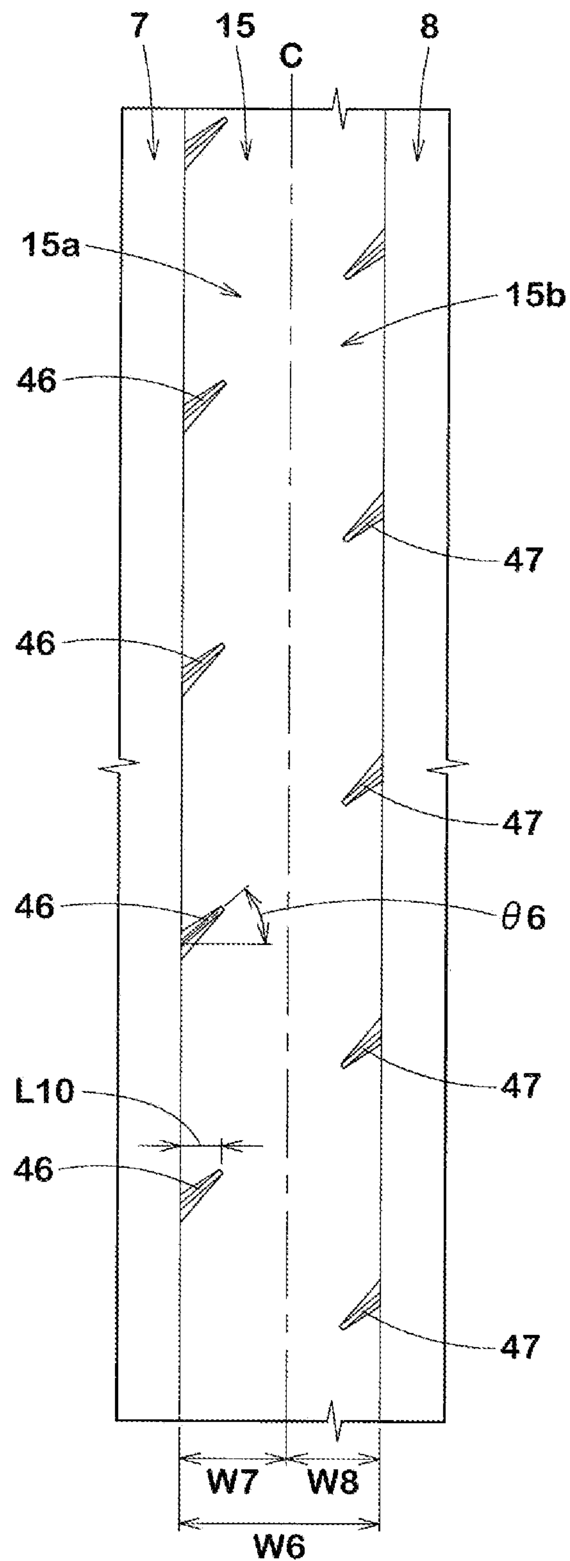
FIG. 11 is an enlarged view of a crown land portion in FIG. 1.

FIG. 11 shows an enlarged view of the crown land portion 15 in FIG. 1. As shown in FIG. 11, the center position in the tire axial direction of the crown land portion 15 is located on the first tread end T1 (shown in FIG. 1) side with respect to the tire equator C. Accordingly, in the crown land portion 15, a width W7 of the ground-contact surface in an outer region 15*a* on the first tread end T1 side with respect to the tire equator C is larger than a width W8 of the ground-contact surface in an inner region 15*b* on the second tread end T2 side with respect to the tire equator C. Specifically, the width W7 of the outer region 15*a* is 51% to 55% of a width W6 of the ground-contact surface of the crown land portion 15. Such a crown land portion 15 linearizes a change in cornering force with a change in steering angle, and serves to improve steering stability and ride comfort.

The crown land portion 15 is provided with a plurality of first crown sipes 46 and a plurality of second crown sipes 47. Each first crown sipe 46, for example, extends from the first crown circumferential groove 7 and terminates within the crown land portion 15. Each second crown sipe 47, for example, extends from the second crown circumferential groove 8 and terminates within the crown land portion 15.

Each first crown sipe 46 and each second crown sipes 47 do not cross the center position in the tire axial direction of the crown land portion 15 and do not cross the tire equator C. A length L10 in the tire axial direction of the first crown sipe 46 or the second crown sipe 47 is, for example, 15% to 30% of the width W6 in the tire axial direction of the ground-contact surface of the crown land portion 15. Accordingly, the stiffness of the crown land portion 15 is reliably maintained, and excellent steering stability is exhibited.

Each first crown sipe 46 and each second crown sipe 47 are inclined, for example, in the second direction relative to the tire axial direction. A maximum angle θ6 of the first crown sipe 46 or the second crown sipe 47 with respect to the tire axial direction is, for example, 16.5 to 64.7°, and preferably 28.6 to 52.6°. In a more preferable mode, the angle difference between the first crown sipe 46 and the second crown sipe 47 is not greater than 5°, and these sipes are provided parallel to each other in the present embodiment. Such first crown sipes 46 and second crown sipes 47 can provide a frictional force in the tire circumferential direction and the tire axial direction in a well-balanced manner.

In a further preferable mode, the maximum angle θ6 of the first crown sipe 46 or the second crown sipe 47 with respect to the tire axial direction is preferably not greater than the angle θ2 (shown in FIG. 4) of the first middle sipe 30 with respect to the tire axial direction, and is preferably not less than the angle θ5 (shown in FIG. 8) of the second middle sipe 40 with respect to the tire axial direction. Accordingly, noise performance is improved while uneven wear of each land portion is suppressed.

The first crown sipes 46 and the second crown sipes 47 are each formed as a chamfered sipe. In a preferable mode, the widths of the chamfered portions of the first crown sipes 46 and the second crown sipes 47 decrease toward the tire equator C side. Such first crown sipes 46 and second crown sipes 47 can suppress uneven wear of the crown land portion 15.

In the present embodiment, each land portion is provided with no sipe, other than the above-described sipes. Accordingly, various performances described above are exhibited in a well-balanced manner. However, the present disclosure is not limited to such a mode.

Figure 12:
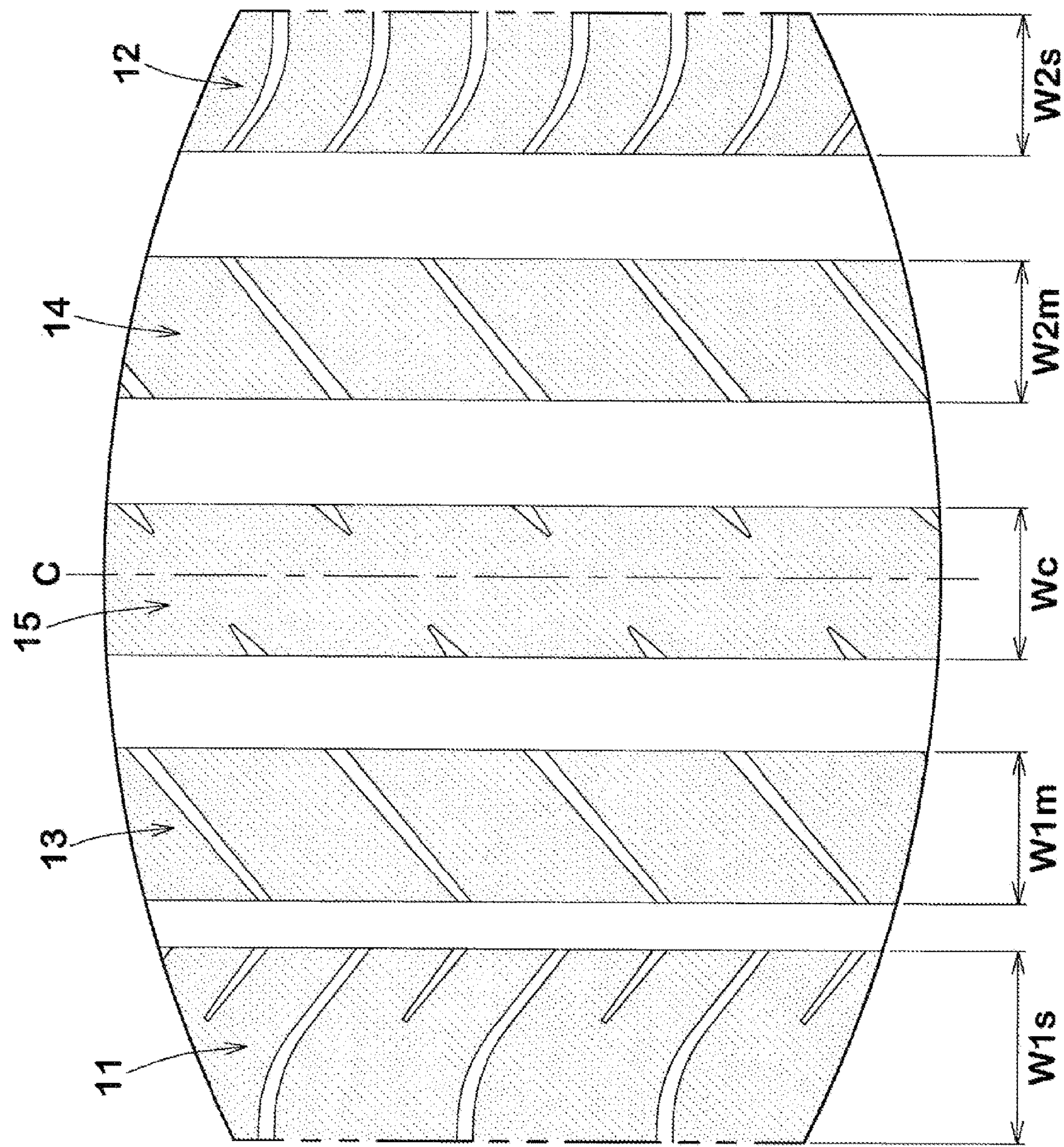
FIG. 12 is an enlarged view showing a ground-contact surface shape when the tread portion is in contact with the ground.

FIG. 12 shows an enlarged view showing a ground-contact surface shape when the tread portion 2 of the present embodiment is in contact with the ground. As shown in FIG. 12, in a state where the tire 1 is fitted on the normal rim with the normal internal pressure, 50% of the normal load is applied to the tire 1, and the tire 1 is brought into contact with a flat surface at a camber angle of 0° (hereinafter, sometimes referred to as "50% load applied state"), a width W1*s* in the tire axial direction of the ground-contact surface of the first shoulder land portion 11 is preferably larger than a width W2*s* in the tire axial direction of the ground-contact surface of the second shoulder land portion 12. In addition, a width W1*m* in the tire axial direction of the ground-contact surface of the first middle land portion 13 is preferably larger than a width W2*m* in the tire axial direction of the ground-contact surface of the second middle land portion 14. Owing to such a land portion width distribution, steering stability is further improved.

In a more preferable mode, in the 50% load applied state, when the widths in the tire axial direction of the ground-contact surfaces of the first shoulder land portion 11, the first middle land portion 13, the crown land portion 15, the second middle land portion 14, and the second shoulder land portion 12 are denoted by W1*s*, W1*m*, W*c*, W2*m*, and W2*s*, the following formula (1) is satisfied. In addition, as a further preferable mode, the tire 1 of the present embodiment also satisfies the following formula (2). In such a tire 1, the land portion closer to the first tread end T1 has higher stiffness. Therefore, even when the center of the ground-contact surface moves toward the first tread end T1 side due to steering, the steering response is stabilized, and a cornering force is generated so as to be linear with respect to an increase in steering angle. Therefore, excellent steering stability and ride comfort are achieved.

$$W1m>Wc>W2m \quad (1)$$

$$W1s>W1m>Wc>W2m\geq W2s \quad (2)$$

In the 50% load applied state, the width W1*s* in the tire axial direction of the ground-contact surface of the first shoulder land portion 11 is preferably 115% to 125% of the width W*c* in the tire axial direction of the ground-contact surface of the crown land portion 15. Accordingly, the stiffness of the first shoulder land portion 11 is optimized, so that noise performance can also be improved in addition to the above-described effects.

From the same viewpoint, in the 50% load applied state, the width W1*m* in the tire axial direction of the ground-contact surface of the first middle land portion 13 is preferably 101% to 107% of the width W*c* in the tire axial direction of the ground-contact surface of the crown land portion 15.

In the 50% load applied state, the width W2*m* in the tire axial direction of the ground-contact surface of the second middle land portion 14 is preferably 90% to 99% of the width W*c* in the tire axial direction of the ground-contact surface of the crown land portion 15. Accordingly, noise performance during straight running is improved. In addition, vibration of the tire 1 during straight running is less likely to be transmitted to the vehicle body side, so that ride comfort is also improved.

From the same viewpoint, in the 50% load applied state, the width W2*s* in the tire axial direction of the ground-contact surface of the second shoulder land portion 12 is preferably 90% to 99% of the width W*c* in the tire axial direction of the ground-contact surface of the crown land portion 15.

As a further preferable mode, in the present embodiment, in the 50% load applied state, the width W2*m* of the second middle land portion 14 is equal to the width W2*s* of the second shoulder land portion 12. Accordingly, the progress of wear of the second middle land portion 14 and the second shoulder land portion 12 becomes uniform, so that uneven wear resistance is improved.

Although the tire of the embodiment of the present disclosure has been described in detail above, the present disclosure is not limited to the above specific embodiment, and various modifications can be made to implement the present disclosure.

EXAMPLES

Figure 13:
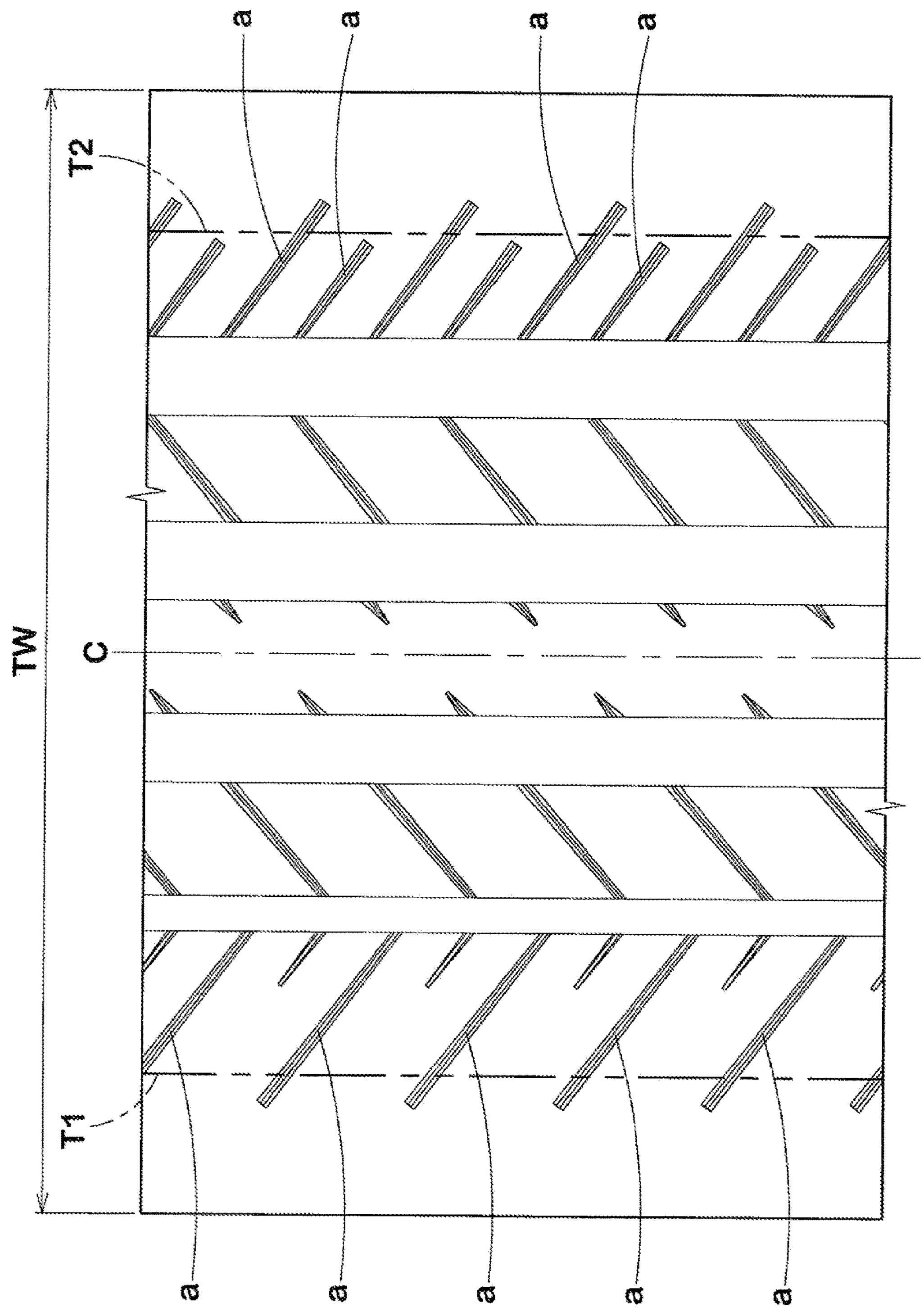
FIG. 13 is a development of a tread portion of a tire of a comparative example.

Tires having the basic pattern in FIG. 1 with a size of 235/45R19 were produced as test tires on the basis of specifications in Table 1. In addition, as a comparative example, a tire in which each shoulder sipe a includes no axial portion as in the present disclosure, is inclined in one direction, and crosses a tread end as shown in FIG. 13 was produced as a test tire.

The tire of the comparative example is substantially the same as that shown in FIG. 1, except for the above-described matters.

Moreover, as a tire (reference tire) serving as a reference for comparing noise performance, a tire in which the width of each land portion of a tread portion thereof is the same as that shown in FIG. 1 and each land portion is provided with no groove and not sipe, was produced.

Each test tire was tested for steering stability and noise performance. The common specifications and the test methods for the respective test tires are as follows.

Mount rim: 19×7.5J

Tire internal pressure: 230 kPa for front wheels, 210 kPa for rear wheels

Test vehicle: front-wheel-drive car having an engine displacement of 2000 cc

Tire mounted position: all wheels

<Steering Stability>

Sensory evaluation was made by a driver for steering stability when the test vehicle ran on a dry road surface. The results are indicated as scores with the steering stability of the comparative example being regarded as 100. A higher value indicates that the steering stability is better.

<Noise Performance>

When the above test vehicle ran on a dry road surface at a speed of 70 km/h, the maximum sound pressure of noise outside the vehicle was measured. As for the results, a sound pressure reduction amount that is the difference from the sound pressure of the reference tire is indicated as an index with the sound pressure reduction amount of the comparative example being regarded as 100. A higher index indicates that the maximum sound pressure of the noise is smaller and that better noise performance is exhibited.

The results of the tests are shown in Table 1.

TABLE 1

| | Comp. Ex. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Drawing showing tread pattern | FIG. 13 | FIG. 1 | FIG. 1 | FIG. 1 | FIG. 1 | FIG. 1 | FIG. 1 | FIG. 1 | FIG. 1 | FIG. 1 |
| Angle θ1 of inclined portion (°) | 37.2 | 37.2 | 15.9 | 28.6 | 52.6 | 65.3 | 37.2 | 37.2 | 37.2 | 37.2 |
| Distance L3 from outer end of first shoulder sipe to first tread end/ width W3 of ground-contact surface of first shoulder land portion (%) | 21 | 43 | 43 | 43 | 43 | 43 | 25 | 30 | 50 | 55 |
| Steering stability (score) | 100 | 110 | 113 | 111 | 108 | 105 | 110 | 110 | 109 | 107 |
| Noise performance (index) | 100 | 124 | 112 | 120 | 126 | 129 | 118 | 121 | 123 | 120 |

As a result of the tests, it is confirmed that the tire of each Example has improved steering stability and noise performance.

Additional Notes

The present disclosure includes the following aspects.

Present Disclosure 1

A tire comprising a tread portion, wherein the tread portion includes four circumferential grooves continuously extending in a tire circumferential direction between two tread ends, and five land portions demarcated by the four circumferential grooves, the two tread ends are ends of a 50%-load ground-contact surface obtained when the tire is fitted on a normal rim with a normal internal pressure, 50% of a normal load is applied to the tire, and the tread portion is brought into contact with a flat surface at a camber angle of 0°, each of the five land portions is provided with no groove having a groove width greater than 2.0 mm, and is provided with only sipes, the five land portions include a shoulder land portion including the tread end, the four circumferential grooves include a shoulder circumferential groove adjacent to the shoulder land portion, the shoulder land portion is provided with a plurality of shoulder sipes each extending from the shoulder circumferential groove to a position beyond the tread end, at least one of the shoulder sipes includes an inclined portion extending from the shoulder circumferential groove so as to be inclined relative to a tire axial direction, and an axial portion having an angle with respect to the tire axial direction smaller than the inclined portion and not greater than 10°, and the axial portion crosses the tread end.

Present Disclosure 2

The tire according to Present Disclosure 1, wherein the shoulder sipe includes a curved portion extending so as to be curved between the inclined portion and the axial portion.

Present Disclosure 3

The tire according to Present Disclosure 2, wherein the curved portion has an arc shape having a radius of curvature of 10 to 40 mm.

Present Disclosure 4

The tire according to any one of Present Disclosures 1 to 3, wherein at least one of sipe edges on both sides of each of the inclined portion and the axial portion is formed as a chamfered portion, and in a tread plan view, a width of the chamfered portion of the axial portion is larger than a width of the chamfered portion of the inclined portion.

Present Disclosure 5

The tire according to any one of Present Disclosures 1 to 4, wherein the tire has a designated mounting direction to a vehicle, the shoulder land portion includes a first shoulder land portion located on an outer side of the vehicle when the tire is mounted on the vehicle, the first shoulder land portion is provided with a plurality of shoulder termination sipes extending from the shoulder circumferential groove and terminating without reaching the tread end, each shoulder termination sipe extends so as to be inclined in the same direction as the inclined portion, and each shoulder termination sipe terminates on an inner side in the tire axial direction with respect to the axial portion.

Present Disclosure 6

The tire according to Present Disclosure 5, wherein at least one of sipe edges on both sides of each shoulder termination sipe is formed as a chamfered portion, and a width of the chamfered portion at an inner end portion in the tire axial direction of the chamfered portion of each shoulder termination sipe is larger than a width of the chamfered portion at an outer end portion in the tire axial direction of the chamfered portion of each shoulder termination sipe.

Present Disclosure 7

The tire according to any one of Present Disclosures 1 to 6, wherein the tire has a designated mounting direction to a vehicle, the shoulder land portion includes a first shoulder land portion located on an outer side of the vehicle when the tire is mounted on the vehicle, and a second shoulder land portion located on an inner side of the vehicle when the tire is mounted on the vehicle, and the number of the shoulder sipes provided on the second shoulder land portion is larger than the number of the shoulder sipes provided on the first shoulder land portion.

Present Disclosure 8

The tire according to Present Disclosure 7, wherein an angle of the inclined portion of the shoulder sipe provided on the second shoulder land portion, with respect to the tire axial direction, is smaller than an angle of the inclined portion of the shoulder sipe provided on the first shoulder land portion, with respect to the tire axial direction.

What is claimed is:

1. A tire comprising: A tire comprising:

a tread portion, wherein the tread portion includes four circumferential grooves continuously extending in a tire circumferential direction between two tread ends, and five land portions demarcated by the four circumferential grooves, the two tread ends are ends of a 50%-load ground-contact surface obtained when the tire is fitted on a normal rim with a normal internal pressure, 50% of a normal load is applied to the tire, and the tread portion is brought into contact with a flat surface at a camber angle of 0°, each of the five land portions has no groove having a groove width greater than 2.0 mm, and includes only sipes, the five land portions include at least one shoulder land portion including the tread end, the four circumferential grooves include a shoulder circumferential groove adjacent to the shoulder land portion, the five land portions include a middle land portion adjacent to the shoulder circumferential groove, the shoulder land portion has a plurality of shoulder sipes each extending from the shoulder circumferential groove to a position beyond the tread end, at least one of the shoulder sipes includes an inclined portion extending from the shoulder circumferential groove and inclined relative to a tire axial direction, and an axial portion having an angle with respect to the tire axial direction smaller than the inclined portion and not greater than 10°, the axial portion crosses the tread end, the tire has a designated mounting direction on a vehicle, the at least one shoulder land portion includes a first shoulder land portion located on an outer side of the vehicle when the tire is mounted on the vehicle, and a second shoulder land portion located on an inner side of the vehicle when the tire is mounted on the vehicle, the first shoulder land portion has a plurality of shoulder termination sipes extending from the shoulder circumferential groove and terminating without reaching the tread end, each shoulder termination sipe extends inclined in a same direction as the inclined portion and terminates on an inner side in the tire axial direction with respect to the axial portion, a number of the shoulder sipes on the second shoulder land portion is larger than a number of the shoulder sipes on the first shoulder land portion, the first shoulder land portion includes only the shoulder sipes and the shoulder termination sipes, and the second shoulder land portion includes only the shoulder sipes, the middle land portion has a plurality of middle sipes fully traversing the middle land portion in a tire axial direction and inclined relative to the tire axial direction, and a distance in the tire circumferential direction from an end on the shoulder circumferential groove side of one of the plurality of middle sipes to an end on the shoulder circumferential groove side of the shoulder sipe is 30% to 50% of a one-pitch length in the tire circumferential direction of the plurality of middle sipes.

2. The tire according to claim 1, wherein at least one of sipe edges on both sides of each shoulder termination sipe is configured as a chamfered portion, and a width of the chamfered portion at an inner end portion in the tire axial direction of the chamfered portion of each shoulder termination sipe is larger than a width of the chamfered portion at an outer end portion in the tire axial direction of the chamfered portion of each shoulder termination sipe.

3. The tire according to claim 1, wherein an angle of the inclined portion of each of the shoulder sipes on the second shoulder land portion, with respect to the tire axial direction, is smaller than an angle of the inclined portion of each of the shoulder sipes on the first shoulder land portion, with respect to the tire axial direction.

4. The tire according to claim 1, wherein a width $W1s$ in the tire axial direction of a ground-contact surface of the first shoulder land portion and a width $W2s$ in the tire axial direction of a ground-contact surface of the second shoulder land portion are in accordance with the following formula:

$$W1s>W2s.$$

5. The tire according to claim 1, wherein a maximum angle θ1 of the inclined portion of each of the shoulder sipes on the first shoulder land portion, with respect to the tire axial direction, and a maximum angle θ4 of the inclined portion of each of the shoulder sipes on the second shoulder land portion, with respect to the tire axial direction, are in accordance with the following formulas:

$$\theta 1>\theta 4; \text{ and}$$

$$\theta 1-\theta 4<5°.$$

6. The tire according to claim 1, wherein for each of the grooves, in a transverse cross-section thereof, a region where a distance between two groove walls is greater than 2.0 mm exceeds 50% of a total depth of the groove.

7. The tire according to claim 1, wherein a maximum angle of the inclined portion of each of the shoulder sipes on the first shoulder land portion, with respect to the tire axial direction, is from 27.2° to 47.2°.

8. The tire according to claim 1, wherein an angle of length in the tire axial direction of each shoulder termination sipe is from 30% to 40% of the width of a ground-contact surface of the first shoulder land portion.

9. The tire according to claim 1, wherein an angle of each shoulder termination sipe with respect to the tire axial direction is from 16.5° to 57.9°.

10. The tire according to claim 1, wherein the shoulder sipe includes a curved portion extending curved between the inclined portion and the axial portion.

11. The tire according to claim 10, wherein the curved portion has an arc shape having a radius of curvature of 10 to 40 mm.

12. The tire according to claim 1, wherein at least one of sipe edges on both sides of each of the inclined portion and the axial portion is configured as a chamfered portion, and in a tread plan view, a width of the chamfered portion of the axial portion is larger than a width of the chamfered portion of the inclined portion.

13. The tire according to claim 12, wherein in the tread plan view, the width of the chamfered portion of the axial portion is from 1.5 to 2.5 larger than the width of the chamfered portion of the inclined portion.

14. The tire according to claim 12, wherein a depth of the inclined portion is from 40% to 60% of a maximum depth of the axial portion.

15. The tire according to claim 1, wherein each of the sipes is a slit having two inner walls extending in the tire radial direction and in which, in a transverse cross-section thereof, a region where a distance between the two inner walls is not greater than 2.0 mm is not less than 50% of a total depth of the slit.

16. The tire according to claim 15, wherein the distance between the two inner walls is from 0.4 mm to 1.0 mm, and the total depth of the slit is from 3.0 mm to 5.5 mm.

* * * * *